(12) United States Patent
Richardson et al.

(10) Patent No.: US 12,721,263 B1
(45) Date of Patent: Sep. 1, 2026

(54) ELECTRIC MOTOR WITH INTEGRATED SELF-SUPPORTING SPINDLE AND AIR COOLING FEATURES FOR A MOWER

(71) Applicant: Parker-Hannifin Corporation, Cleveland, OH (US)

(72) Inventors: Jason S. Richardson, Chuckey, TN (US); Todd A. Link, Gray, TN (US); Randall D. Thompson, Lancaster, SC (US); Kyle J. Merrill, Chuckey, TN (US)

(73) Assignee: Parker-Hannifin Corportion, Cleveland, OH (US)

( * ) Notice: Subject to any disclaimer, the term of this patent is extended or adjusted under 35 U.S.C. 154(b) by 392 days.

(21) Appl. No.: 18/466,886

(22) Filed: Sep. 14, 2023

Related U.S. Application Data

(60) Provisional application No. 63/416,673, filed on Oct. 17, 2022.

(51) Int. Cl.

| | |
|---|---|
| ***A01D 34/78*** | (2006.01) |
| ***H02K 5/10*** | (2006.01) |
| ***H02K 9/06*** | (2006.01) |
| ***H02K 9/22*** | (2006.01) |
| *A01D 101/00* | (2006.01) |

(52) U.S. Cl.
CPC ............... *A01D 34/78* (2013.01); *H02K 5/10* (2013.01); *H02K 9/06* (2013.01); *H02K 9/227* (2021.01); *A01D 2101/00* (2013.01)

(58) Field of Classification Search
CPC ...... A01D 34/78; A01D 34/001; A01D 34/82; A01D 34/006; A01D 34/68; A01D 34/74; A01D 34/733; H02K 9/227; H02K 9/06; H02K 9/193; H02K 5/10; H02K 5/207; H02K 7/003; H02K 7/14
See application file for complete search history.

(56) References Cited

U.S. PATENT DOCUMENTS 7,075,202 B2 * 7/2006 Leoni ...................... H02K 7/14 310/90
8,191,342 B2 6/2012 Ishii et al.
8,227,948 B1 * 7/2012 Fox .......................... H02K 1/06 310/88
8,701,806 B2 4/2014 Ishii et al.
(Continued)

OTHER PUBLICATIONS

Greenworks Pro, Zero Turn Mower 7404702 (Model No. RZ48), Owners Manual, www.GreenworksCommerical.com, Aug. 2016.

*Primary Examiner* — Joseph M Rocca
*Assistant Examiner* — Robert E Pezzuto
(74) *Attorney, Agent, or Firm* — McDonnell Boehnen Hulbert & Berghoff LLP

(57) ABSTRACT

An example assembly includes: a housing having a motor housing portion and a spindle housing portion, wherein the spindle housing portion comprises a central tube; an electric motor disposed within the motor housing portion of the housing, wherein the electric motor has a rotor; a spindle coupled to the rotor of the electric motor, wherein the spindle is disposed within the central tube of the spindle housing portion; an impeller coupled to the spindle and configured to rotate therewith; and a shroud mounted to the housing and having a plurality of windows, wherein as the impeller rotates, the impeller draws air through the plurality of windows of the shroud to cool the electric motor.

18 Claims, 8 Drawing Sheets

(56) References Cited

U.S. PATENT DOCUMENTS

| | | | | |
|---|---|---|---|---|
| 10,188,032 | B2 * | 1/2019 | Ito | A01D 34/81 |
| 11,399,459 | B2 | 8/2022 | Nishimura et al. | |
| 2020/0383266 | A1 * | 12/2020 | Nishimura | H02K 9/06 |
| 2022/0078971 | A1 | 3/2022 | Ito et al. | |
| 2022/0264794 | A1 | 8/2022 | Uchimi et al. | |
| 2023/0231436 | A1 * | 7/2023 | Schuller-Rach | H02K 7/085<br>56/17.5 |

* cited by examiner

ELECTRIC MOTOR WITH INTEGRATED SELF-SUPPORTING SPINDLE AND AIR COOLING FEATURES FOR A MOWER

CROSS REFERENCE TO RELATED APPLICATION

The present application claims priority to U.S. Provisional Application No. 63/416,673 filed on Oct. 17, 2022, the entire contents of which are herein incorporated by reference as if fully set forth in this description.

TECHNICAL FIELD

This disclosure relates to an assembly of an electric motor and an integrated self-supporting spindle for a work function (e.g., cutting blade of a mowing deck, traction, etc.) of a mower. More particularly, the assembly of the electric motor and integrated self-supporting spindle includes air cooling features to facilitate cooling the assembly during operation.

BACKGROUND

The turf market is transitioning zero-turn-radius (ZTR) mowers from hydrostatic ground drive and belt driven mower decks to electric drives for all functions. It may thus be desirable to have an electric motor configuration that reduces cost given limitations of the turf market. It may also be desirable to configure the electric motor in a manner that facilitates integration of electric motors into ZTR mower applications.

During operation, the electric motor generates heat, and it may thus be desirable to integrate cooling features in an assembly including the electric motor. It is with respect to these and other considerations that the disclosure made herein is presented.

SUMMARY

The present disclosure describes implementations that relate to an electric motor with integrated self-supporting spindle and air cooling features for mower.

In a first example implementation, the present disclosure describes an assembly. The assembly includes: a housing having a motor housing portion and a spindle housing portion, wherein the spindle housing portion comprises a central tube; an electric motor disposed within the motor housing portion of the housing, wherein the electric motor has a rotor; a spindle coupled to the rotor of the electric motor, wherein the spindle is disposed within the central tube of the spindle housing portion; an impeller coupled to the spindle and configured to rotate therewith; and a shroud mounted to the housing and having a plurality of windows, wherein as the impeller rotates, the impeller draws air through the plurality of windows of the shroud to cool the electric motor.

In a second example implementation, the present disclosure describes a mower. The mower includes: a source of electric power; a mower deck; and one or more assemblies mounted to the mower deck and coupled to respective blades, wherein an assembly of the one or more assemblies is the assembly of the first example implementation, wherein the source of electric power is configured to provide electric power to wire windings of the stator, and wherein the spindle is configured to drive a blade of the respective blades.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Disclosed herein are systems and assemblies of an integrated motor and spindle configuration that reduces cost. The disclosed systems and assemblies may also facilitate integration of an electric motor into ZTR mower applications, and enhance heat dissipation from the electric motor via air cooling.

Figure 1:
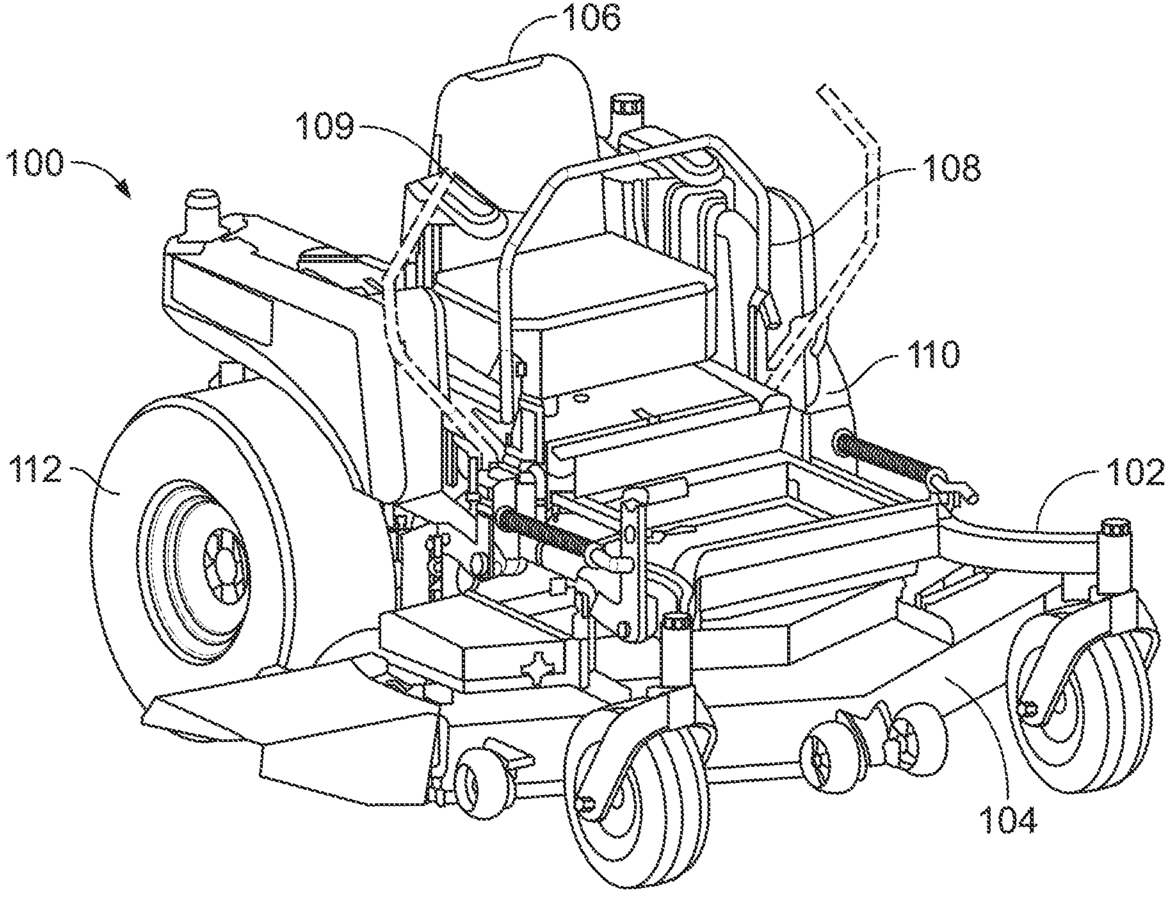
FIG. 1 illustrates a perspective view of a mower, in accordance with an example implementation.

FIG. 1 illustrates a perspective view of a mower 100, in accordance with an example implementation. The mower 100 can be, for example, zero-turn-radius (ZTR) mower (e.g., a lawn mower with a turning radius that is effectively zero). Although the implementations disclosed herein are described with respect to a mower, other the disclosed assemblies can be used with other vehicles (e.g., a skid-steer machine).

The mower 100 includes a frame 102. The mower 100 also includes a mower deck 104 supported by the frame 102. The mower deck 104 can house one or more blades (not shown in FIG. 1; see blade 208 in FIGS. 2A and 3) for mowing grass, for example. The mower 100 further includes an operator seat 106 and steering control levers 108, 109 for operating the mower 100.

In examples, a rear mounted engine (not shown) can be mounted to the frame 102 behind the operator seat 106. The engine can be an internal combustion engine configured to provide mechanical power to an electric power generator. The electric power generator then provides electric power to one or more electric motors that drive respective rear wheels, such as left wheel 110 and right wheel 112, which propel the mower 100, for example. The electric power generator can also provide power to one or more electric motors that drive the blades of the mower deck 104. In another example, rather than using an engine and an electric power generator, the mower 100 can be a battery-driven vehicle, where a rechargeable battery provides electric power to drive the various electric motors. As such, the mower 100 has a source of electric power (e.g., a power generator or a battery) for driving electric motors.

The steering control levers 108, 109 can be configured to control speed and direction of the wheels 110, 112 via actuating the respective electric motors. Thus, the drive system can be controlled by an operator to drive the wheels 110, 112 independently and propel the mower 100. The configuration of the mower 100 is an example configuration. It should be understood that the disclosed systems and assemblies described below could be used in other mower configurations and other vehicle types in addition to mowers.

Figure 2A:
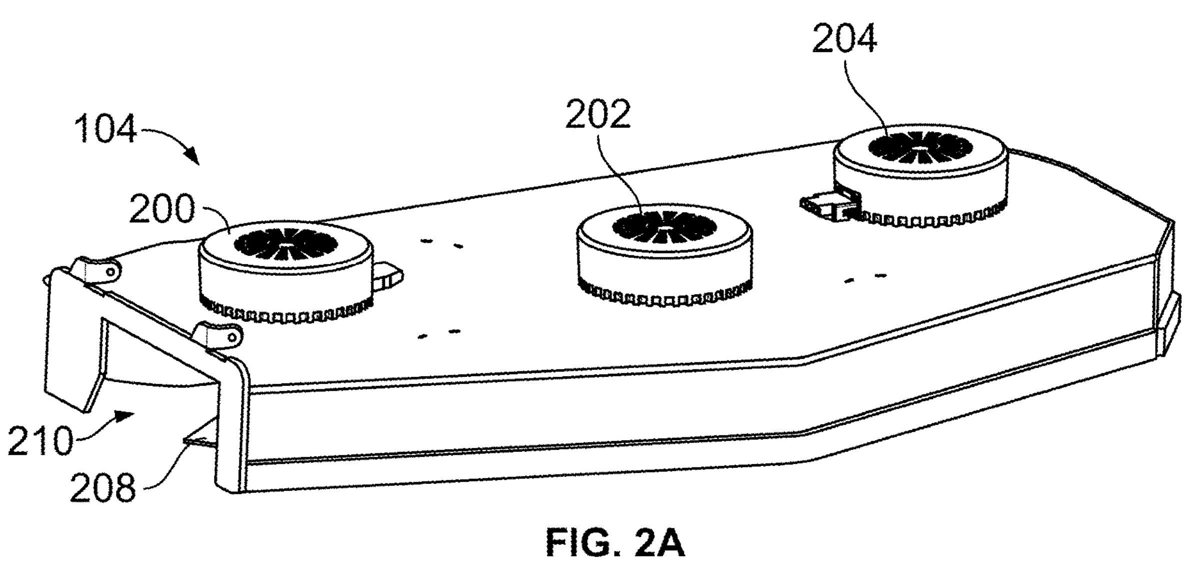
FIG. 2A illustrates a perspective view of a mower deck with electric motor assemblies driving blades of the mower deck, in accordance with an example implementation.
Figure 2B:
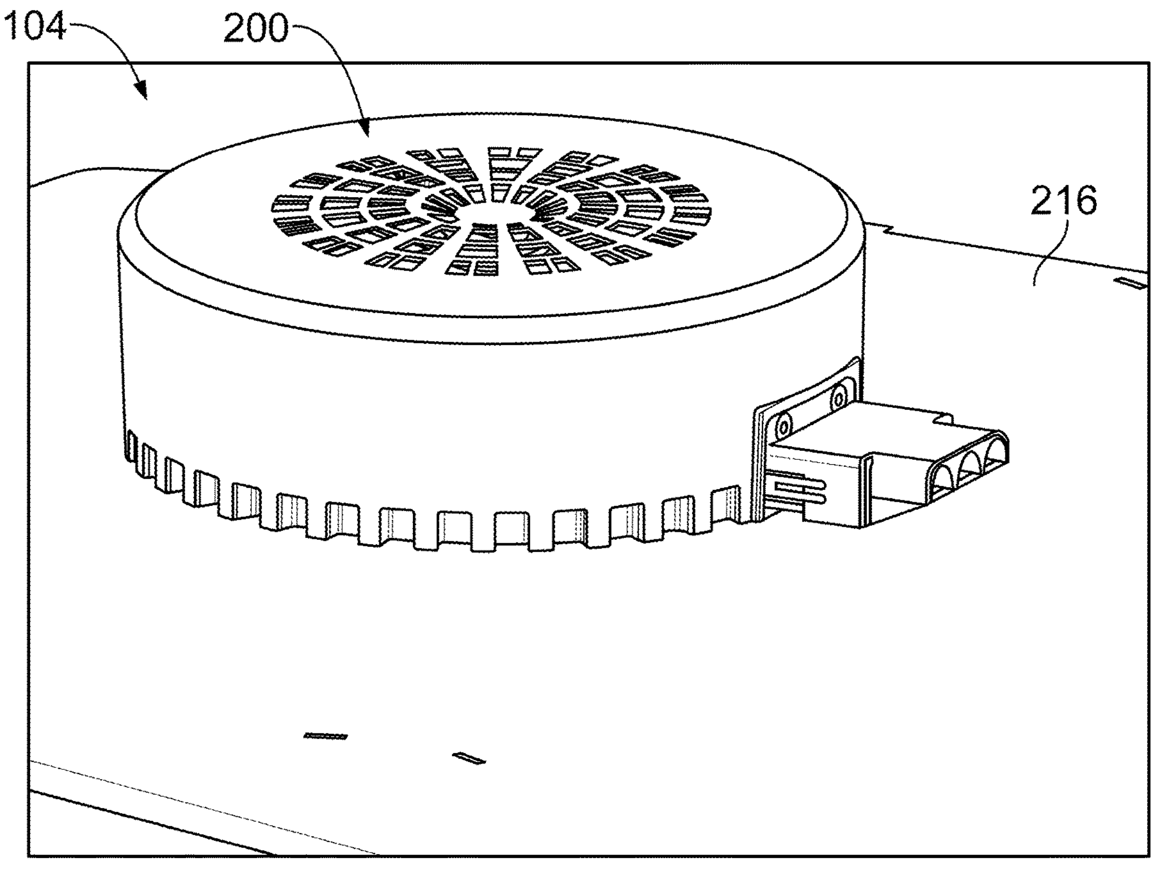
FIG. 2B illustrates a partial perspective view of the mower deck of FIG. 2A, in accordance with an example implementation.

FIG. 2A illustrates a perspective view of the mower deck 104 with electric motor assemblies driving blades of the mower deck 104, and FIG. 2B illustrates a partial perspective view of the mower deck 104, in accordance with an example implementation. The mower deck 104 can be made of sheet metal for example, and may include a plurality of electric motor assemblies such as assembly 200, assembly 202, and assembly 204.

Each assembly of the assemblies 200, 202, 204 includes a respective electric motor with an integrated spindle configured to drive a respective blade of the mower deck 104. Although three assemblies are shown, in other example implementations, more or fewer electric motor assemblies and blades could be used. The assemblies 200, 202, 204 can be coupled to a top plate 216 of the mower deck 104 via fasteners (bolts, screws, etc.) as described below with respect to FIG. 4.

Each of the assemblies 200-204 can be coupled to, and is configured to drive, a blade for cutting grass. For example, the assembly 200 is coupled to a blade 208 for cutting grass shown in FIG. 2A. As shown in FIG. 2A, the mower deck 104 has an outlet 210 for discharging grass that is cut by the blades of the mower deck 104.

Figure 3:
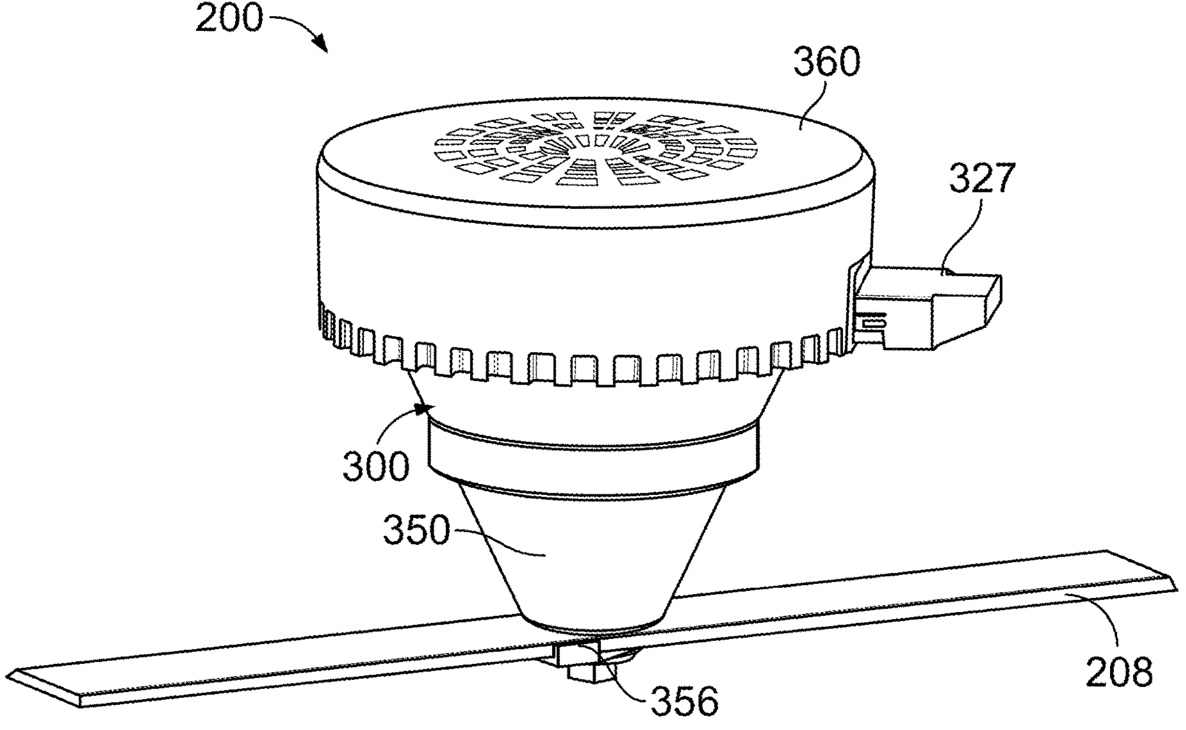
FIG. 3 illustrates a perspective view of an assembly with a blade coupled thereto, in accordance with an example implementation.
Figure 4:
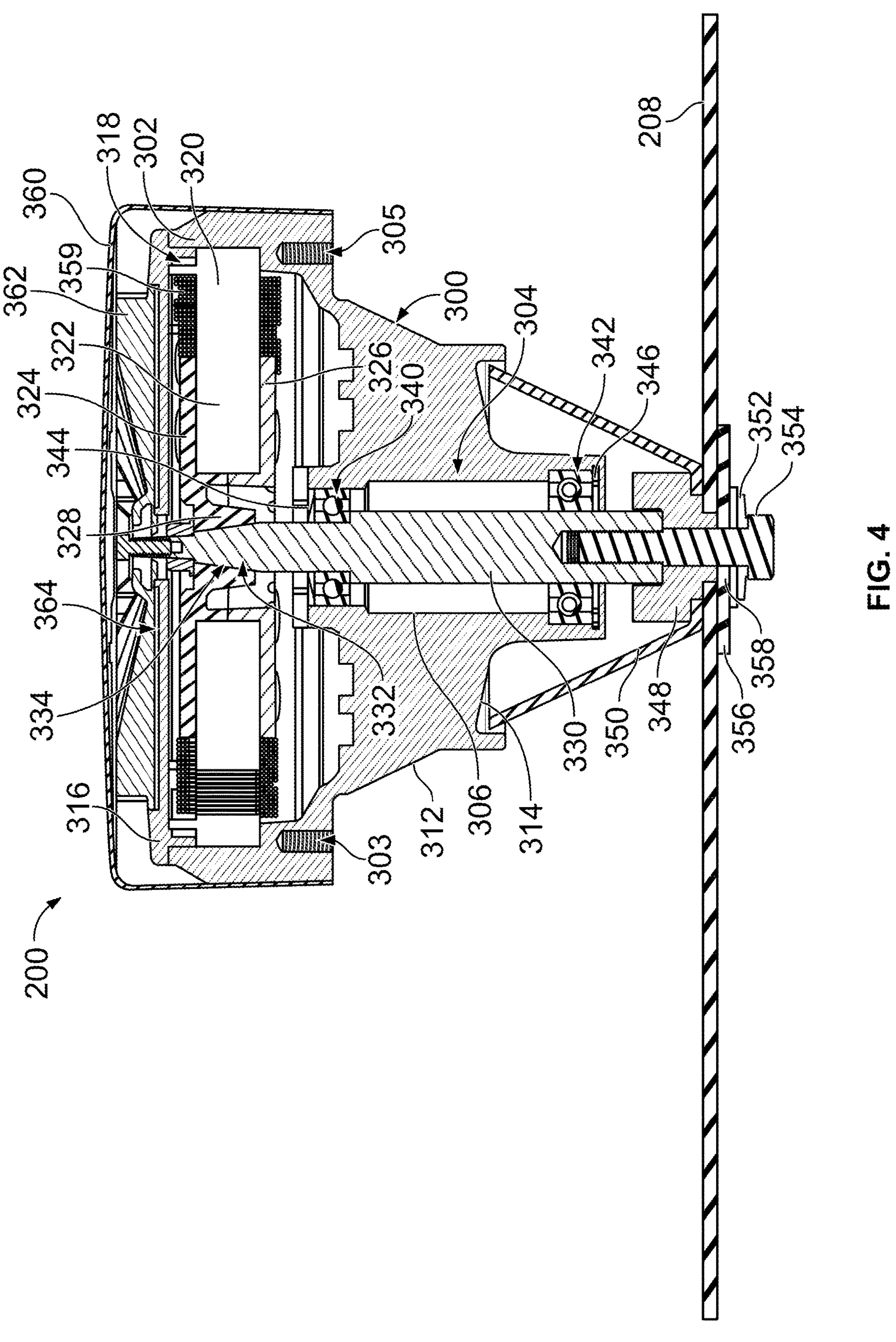
FIG. 4 illustrates a cross-sectional view of the assembly of FIG. 3, in accordance with an example implementation.

FIG. 3 illustrates a perspective view of the assembly 200 with the blade 208 coupled thereto, and FIG. 4 illustrates a cross-sectional view of the assembly 200, in accordance with an example implementation. FIGS. 3-4 are described together.

The assembly 200 has a housing 300 with hole 303 and hole 305 shown in FIG. 4. Bolts can be disposed through the holes 303, 305 to couple the housing 300 to the top plate 216 of the mower deck 104 and attach the assembly 200 to the mower deck 104. As shown in FIG. 4, the housing 300 includes a motor housing portion 302 (upper housing portion) and a spindle housing portion 304 integrated together to form the housing 300.

The spindle housing portion 304 has a central tube 306 disposed within the housing 300. In the example implementation of FIGS. 3-4, the housing 300 has a tapered or conical section 312 and conical section 314 that connect the motor housing portion 302 to the spindle housing portion 304. The assembly 200 further includes a lid or housing cover 316, thereby forming an enclosure having an internal chamber therein.

The assembly 200 includes an electric motor 318 mounted within the enclosure formed by the housing 300 and the housing cover 316. The electric motor 318 includes a stator 320 fixedly-positioned within the motor housing portion 302.

The electric motor 318 further includes a rotor 322 disposed within the stator 320. The rotor 322 is sandwiched or interposed between an upper rotor clamping plate 324 and a lower rotor clamping plate 326. As depicted in FIG. 4, the upper rotor clamping plate 324 has a hub 328 having an internal taper.

In one example, a controller of the electric motor 318 (including an inverter) may be disposed external to the assembly 200. The controller may provide three-phase, alternating current (AC) electric power to coils of the stator 320 via terminals of a terminal block assembly 327 mounted through the housing 300 as shown in FIG. 3.

In another example, the inverter may be disposed within the assembly 200. In this example, a direct current (DC) electric power and a control signal is provided to the inverter via the terminal block assembly 327, and the inverter generates the AC electric power to drive the coils of the stator 320.

The assembly 200 further includes a spindle 330 coupled to the hub 328 of the upper rotor clamping plate 324. The spindle 330 has a tapered upper end 332 that is received within, and complies to, the internal taper of the hub 328. The tapered upper end 332 and the internal taper of the hub 328 form a self-holding taper arrangement 334. The self-holding taper arrangement 334 involves a shallow taper angle, such that the tapered upper end 332 and the hub 328 are wedged to each other firmly. With this configuration, torque can be transmitted from the hub 328 of the rotor 322 to the spindle 330 without a locking device. This self-holding taper arrangement 334 provides for self-aligning of the spindle 330 with the hub 328, and may preclude any backlash that might be characteristic of other coupling mechanisms. However, in other examples, other mechanisms can be used for torque transmission such as a spline arrangement, a key-keyway-key seat arrangement, etc.

As the rotor 322 rotates, torque is generated at the spindle 330. The spindle 330 is supported by one or more bearings comprising, for example, an upper bearing 340 mounted at an upper end of the spindle 330 within the central tube 306, and a lower bearing 342 mounted at a lower end of the spindle 330 within the central tube 306. The bearings 340, 342 facilitate rotation of the spindle 330 relative to the housing 300.

In an example, a wave spring 344 can be mounted atop the upper bearing 340. The inner race of the upper bearing 340 can be mounted between a shoulder formed in the central tube 306 and a shoulder formed in the spindle 330. The wave spring 344 presses against the outer race of the upper bearing 340.

During assembly, the wave spring 344, the spindle 330, and the bearings 340, 342 can be inserted from the bottom of the housing 300. A retaining ring 346 can then be inserted to interface with the lower bearing 342 and retain the spindle assembly (i.e., the wave spring 344, the spindle 330, and the bearings 340, 342) within the central tube 306. During operation, the wave spring 344 applies a biasing force on the upper bearing 340, and thus on the spindle 330 and the lower bearing 342, against the retaining ring 346. This way, the wave spring 344 can maintain tightness of the spindle assembly, and reduce noise and vibration.

Advantageously, if any of the components of the spindle assembly deteriorates over time (e.g., one of the bearings 340, 342 fails), performing maintenance of the spindle assembly without having to replace the entire assembly is possible. The spindle assembly can be removed from the bottom, the bearings 340, 342 or other components can be changed, and the spindle assembly can be re-inserted into the central tube 306.

At the lower end of the spindle 330, the assembly 200 includes a mounting spacer 348. Changing dimensions of the mounting spacer 348 can facilitate mounting the blade 208 at different heights.

The assembly 200 further includes an airflow cone 350 that is mounted about a portion of the spindle housing portion 304, and particularly about a portion of the central tube 306. The airflow cone 350 does not contact the housing 300 at the upper end of the airflow cone 350 (i.e., there is a gap between the upper end of the airflow cone 350 and the housing 300). The airflow cone 350 rotates with the blade 208 and the mounting spacer 348, and is configured to block debris and grass, thereby protecting the bearings 340, 342.

Particularly, as the blade 208 rotates and cuts grass, the airflow cone 350 keeps the grass swirling and away from the spindle 330, allowing the grass to be directed toward the outlet 210 of the mower deck 104. The conical smooth shape of the airflow cone 350 may preclude grass and debris from sticking to the assembly 200. Further, the airflow cone 350 can facilitate airflow to aid with cooling the assembly 200 during operation.

The assembly 200 further includes a Bellville washer 352 and a screw 354 (e.g., a hex head screw) at the bottom end of the assembly 200 as shown in FIG. 4. The screw 354 is threadedly engaged with the spindle 330 such that the screw 354 rotates with the spindle 330.

In an example, the screw 354 has right-handed threads and the electric motor 318 is configured such that the rotor 322 rotates in a clockwise direction from a top view perspective of the assembly 200. This way, as the rotor 322 rotates, it tends to tighten the screw 354 and keep it clamped to the Bellville washer 352.

In one example, the screw 354 and the Bellville washer 352 can facilitate transmitting torque from the spindle 330 to the blade 208. In this example, the Bellville washer 352 may interface directly with the blade 208 and clamps the blade 208 against the mounting spacer 348. As the spindle 330 rotates, the screw 354 and the Bellville washer 352 rotate therewith, thereby causing the blade 208 to rotate.

In some applications, the blade 208 may encounter a hard obstacle (e.g., a rock) during its rotation. In some instances, the hard obstacle may force the blade 208 to stop suddenly. Such sudden stoppage of the blade 208 may cause damage to the electric motor 318. In these applications, the assembly 200 can include a breakaway configuration that allows the rotor 322 to keep rotating as the blade 208 stops suddenly.

Particularly, the assembly 200 can include a blade adapter 356 and a blade adapter driver 358. The Bellville washer 352 is clamped against the blade adapter driver 358, and thus the blade adapter driver 358 rotates with the Bellville washer 352 and the spindle 330. The blade adapter driver 358 is also clamped against the mounting spacer 348, and thus causes the mounting spacer 348 to rotate therewith.

Further, the blade adapter driver 358 is coupled to the blade adapter 356 and is configured to rotate the blade adapter 356. The blade adapter 356 in turn has receptacles or channels that receive the blade 208 therein. With this configuration, the blade adapter 356 rotates the blade 208.

In one example, the blade adapter 356 can be made of plastic material, and the receptacles may break to allow the rotor 322 to continue rotating if the blade 208 hits an obstacle and stops rotating. In another example, an alternative blade adapter made of sheet metal can be used and its receptacle can bend as opposed to break when the blade 208 hits an obstacle.

The Bellville washer 352 (e.g., a conical spring washer, disc spring, or cupped spring washer) can be configured as a conical shell, which is loaded along its axis by the screw 354. The frusto-conical shape of the Bellville washer 352 imparts spring-like characteristics or compliance against the component with which it interfaces.

The stator 320 comprises one or more stator lamination stacks. The stator 320 also includes a plurality of coils or wire windings, such as wire windings 359 shown in FIG. 4, wrapped about slots formed in the stator lamination stack. In the example implementation of FIG. 4, the wire windings have a focused windings arrangement such that each individual coil has its own wire windings, i.e., there is one bundle of wire around each pole. When electric current is provided through the wire windings of the stator 320, a magnetic field is generated.

The stator 320 forms an annular space therein, and the rotor 322 is disposed within such annular space. The rotor 322 can have a rotor core that can include one or more rotor lamination stacks mounted between the upper rotor clamping plate 324 and the lower rotor clamping plate 326.

Magnets can be disposed between the petals of the rotor laminations. Such magnets are configured to interact with the magnetic field generated by the stator 320 in order to rotate the rotor 322 and produce torque at the spindle 330.

In the example implementation shown in the figures, the electric motor 318 is configured as a permanent magnet brushless DC three-phase motor. The magnets are arranged in a spoke configuration. Such configuration may provide enhanced power density and efficiency at a low cost of manufacturing, which may be desirable in a lawnmower. As an example for illustration, the electric motor 318 can be configured as a 12-pole, 18-slot, permanent magnet, brushless DC motor. However, other types of electric motors could be used.

As the electric motor 318 operates and electric current is provided to the wire windings of the stator 320, heat is generated by the stator 320. The configuration of the assembly 200 may enhance heat transfer from the assembly 200 to its environment (e.g., to the atmosphere).

The housing 300, which integrates the motor housing portion 302 and the spindle housing portion 304, may enhance heat transfer or dissipation from the assembly 200. Particularly, the unitary construction of the housing 300 increases the surface area of the housing 300 from which heat can be dissipated. Rather than heat being rejected from a motor housing alone, heat is also dissipated from the entire surface area of the housing 300, which includes the spindle housing portion 304. This configuration may increase efficiency of heat rejection and may increase the efficiency and life of the electric motor 318.

In an example, the housing 300 and the housing cover 316 can be made of aluminum to enhance heat dissipation to the environment of the assembly 200. Also, the motor housing portion 302 may have fins (e.g., fin 516 shown in FIG. 5) configured in a circular array about an exterior surface of the motor housing portion 302. Such fins of the motor housing portion 302 may further increase the surface area from which heat is dissipated, and may thus enhance heat dissipation. Further, as the blade 208 rotates, it blows air toward the housing 300 to help dissipating heat from the housing 300 and its respective fins. The fins of the motor housing portion 302 may be shallow to preclude grass and debris from sticking to the housing 300.

To further enhance cooling of the assembly 200, the assembly 200 includes a shroud 360 and a fan or impeller 362 shown in FIG. 4. The impeller 362 is mounted partially in a circular depression or circular recess 364 formed in the housing cover 316.

Figure 5:
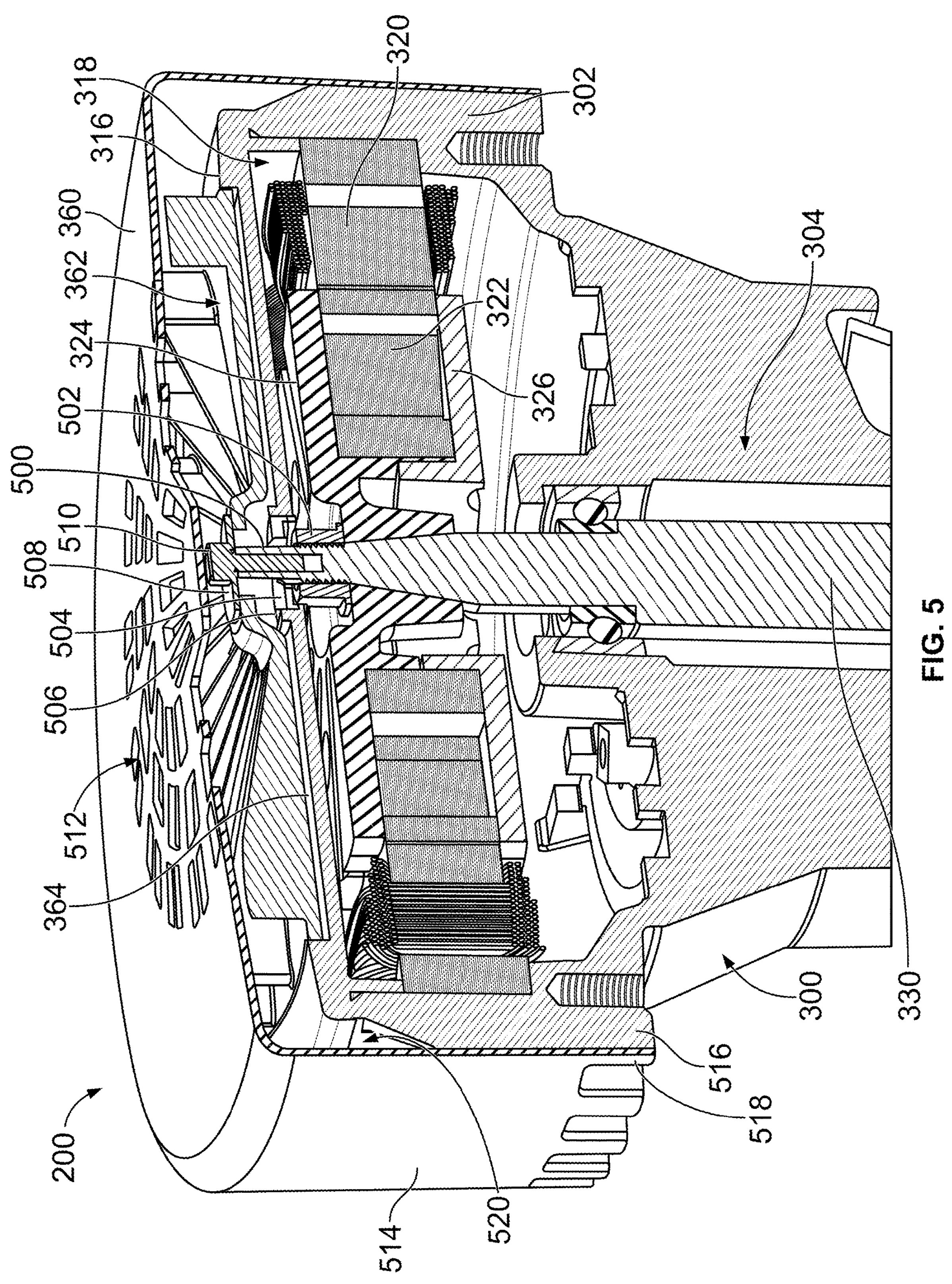
FIG. 5 illustrates a perspective partial cross-sectional view of the assembly of FIG. 3, in accordance with an example implementation.
Figure 6:
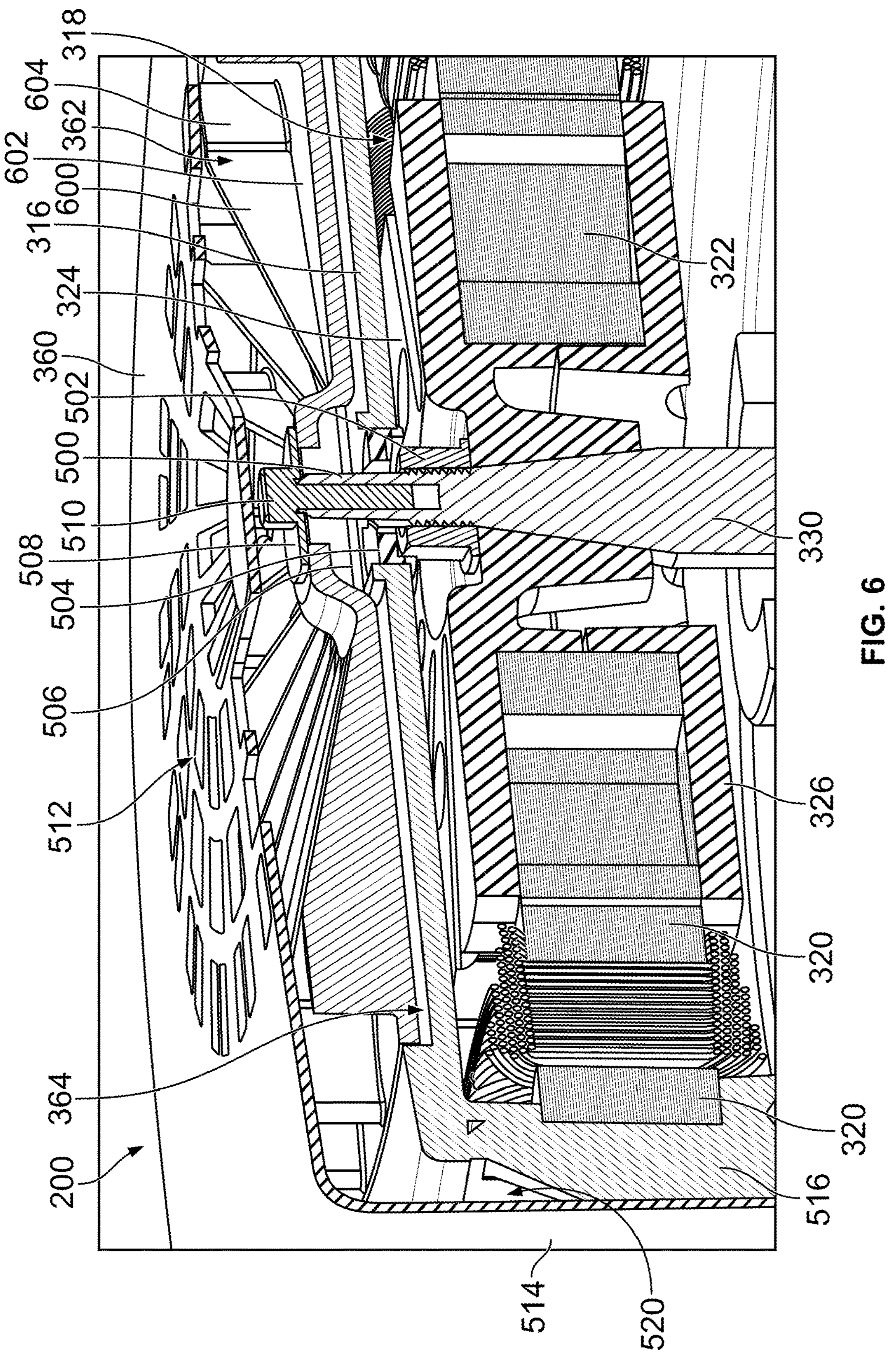
FIG. 6 illustrates another perspective partial cross-sectional view of the assembly of FIG. 3, in accordance with an example implementation.

FIG. 5 illustrates a perspective partial cross-sectional view of the assembly 200, and FIG. 6 illustrates another perspective partial cross-sectional view of the assembly 200, in accordance with an example implementation. FIG. 6 depicts an enlarged view of the assembly 200 to show details of the shroud 360, the impeller 362, and the upper end of the spindle 330.

As shown in FIGS. 5-6, the upper end of the spindle 330 has a spindle extension 500 that extends through a central hole in the housing cover 316. The spindle extension 500 has internal threads and external threads. The external threads allow a nut 502 to be coupled thereto and retain the spindle 330 to the upper rotor clamping plate 324.

The assembly 200 further includes a seal 504 disposed in the central hole of the housing cover 316 around the spindle extension 500. The seal 504 may preclude debris, water, etc. from entering into the electric motor 318. As an example, the seal 504 can include a low friction sealing material such as Teflon®.

An impeller spacer 506 is also mounted about the spindle extension 500. The spindle extension 500 can have a tapered end that interfaces with a corresponding internal taper in the impeller spacer 506. This way torque can be transmitted from the spindle 330 to the impeller spacer 506. The impeller 362 is mounted to and centered by the impeller spacer 506.

The assembly 200 further includes a washer 508 and a screw 510 (e.g., a hex head screw). When the screw 510 is tightened, it causes the washer 508 to clamp the impeller 362 against the impeller spacer 506, which rotates with the spindle 330. With this configuration, as the spindle 330 rotates, the impeller 362 rotates therewith.

In an example, the shroud 360 can be made of a plastic material. For example, the shroud 360 can be made of Nylon 66 (e.g., a type of polyamide or nylon made of two monomers each containing 6 carbon atoms, hexamethylenediamine and adipic acid). In one example, such Nylon 66 material can be glass-filled.

The shroud 360 is generally shaped as a bowl having a top side (e.g., an end plate) and a peripheral side (e.g., a ring portion). The shroud 360 has a plurality of air flow openings or plurality of windows 512 formed in the top side of the shroud 360. For example, as depicted in FIGS. 5-6, the plurality of windows 512 include several concentric arrays of rectangular windows. Other shapes (circular, square, parallelogram, etc.) and patterns are contemplated. As explained below, the plurality of windows 512 operate as vents through which air can be drawn into the assembly 200 for cooling.

In an example, a peripheral side 514 (e.g., ring portion) of the shroud 360 is tapered inward to form a friction lock with the exterior surface of the motor housing portion 302. In other words, as the shroud 360 is mounted to the housing 300, the peripheral side 514 expands and the shroud 360 is locked to the housing 300 via friction between an interior surface of the shroud 360 and the exterior surface of the housing 300. Particularly, the motor housing portion 302 includes fins, such as fin 516, which are configured in a circular array about an exterior surface of the motor housing portion 302, and the inner surface of the peripheral side 514 of the shroud 360 is mounted to the fins of the motor housing portion 302. The peripheral side 514 of the shroud 360 forms a friction lock with the fins of the motor housing portion 302 due to the peripheral side 514 being tapered inward.

The fins of the motor housing portion 302 are formed as ridges with empty spaces or recesses therebetween. Such recesses are configured as air flow conduits as explained below.

In an example, the peripheral side 514 of the shroud 360 has legs or tabs, such as tab 518, disposed in a circular array with spaces therebetween. The plurality of tabs interface respectively with the plurality of fins of the motor housing portion 302. In an example, material can be added to sides of the tabs to partially surround the fins of the motor housing portion 302 to further secure the shroud 360 to the housing 300.

As mentioned above, the impeller 362 rotates with the spindle 330. As the impeller 362 rotates, it pulls air through the plurality of windows 512 of the shroud 360.

Referring to FIG. 6, the impeller 362 has a plurality of blades, such as blade 600. The blades form a circular array on an upper surface 602 of the impeller 362. As shown, the height of a blade, such as the blade 600, progressively (e.g., linearly) increases radially-outward from a center of the impeller 362.

Further, a radially-outward portion 604 (e.g., radially outermost portion) of the blade 600 is formed as an airfoil (e.g., a structure with curved surfaces). Referring to FIGS. 5-6 together, the spindle 330 and the impeller 362 can rotate in a clockwise direction from a top view perspective of FIGS. 5-6. As the impeller 362 rotates, air slips or slides about the respective surfaces of the airfoils of the blades and is pushed toward an inner surface of the peripheral side 514 of the shroud 360. With this configuration, the impeller 362 operates as a centrifugal fan.

Air pushed by the impeller 362 then flows through an annular space 520 laterally between the inner surface of the peripheral side 514 of the shroud 360 and a recessed surface between the respective fins of the motor housing portion 302. Thus, air pushed by the impeller 362 flows between the fins of the motor housing portion 302 and facilitates heat removal therefrom. Air then exits through the spaces between the fins.

Several variations can be implemented to the configuration of the assembly 200 shown in FIGS. 4-6. For example, features can be added to the shroud to make it sturdier. Further, the configuration of the impeller 362 is an example for illustration and several variations can be implemented. For instance, the length of the blades and configuration of the airfoils can change.

Figure 7:
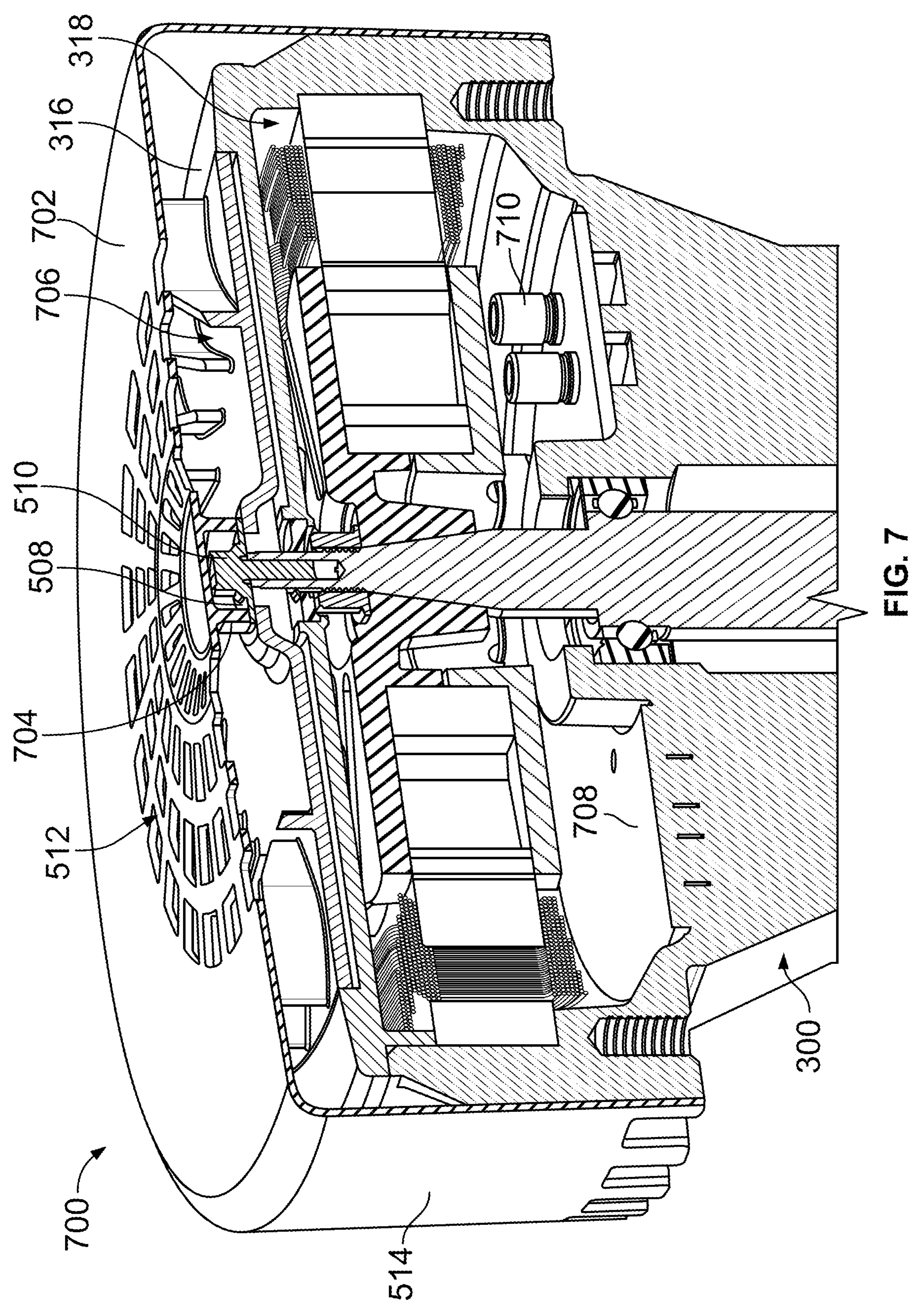
FIG. 7 illustrates a partial perspective cross-sectional view of an assembly, in accordance with an example implementation.

FIG. 7 illustrates a partial perspective cross-sectional view of an assembly 700, in accordance with an example implementation. The assembly 700 is similar to the assembly 200, and common components between the assembly 200 and the assembly 700 are designated with the same reference numbers.

The assembly 700 includes a shroud 702 that differs from the shroud 360 in that the shroud 702 has a cylindrical protrusion 704 that is hollow and protrudes downward. The cylindrical protrusion 704 extends downward to contact and rest on the washer 508, which is supported by an impeller 706.

This way, the central portion of the shroud 702 is supported, which may render the shroud 702 sturdier. Particularly, referring back to FIG. 2A, if an operator steps on the mower deck 104 and accidently steps on a shroud of any of the assemblies 200-204, the shroud might bend inward. While the shroud can be made of a sturdy material that resists bending and breaking, the cylindrical protrusion 704 supports the central portion of the shroud 702 and may preclude bending and breaking of the shroud 702.

Figure 8:
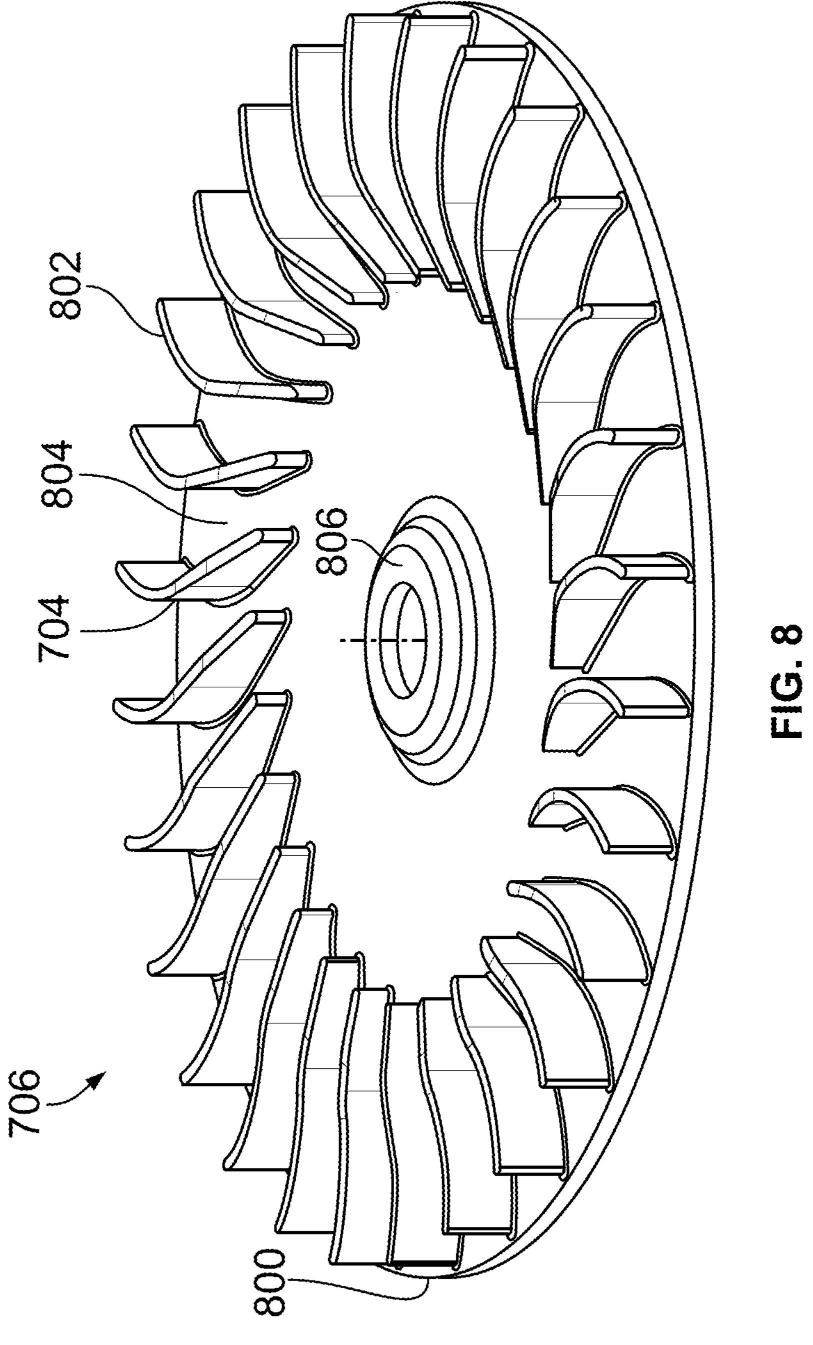
FIG. 8 illustrates a perspective view of an impeller, in accordance with an example implementation.

FIG. 8 illustrates a perspective view of the impeller 706, in accordance with an example implementation. The impeller 706 has a plate 800 and a plurality of blades, such as blade 802. The blades form a circular array on an upper surface 804 of the plate 800 of the impeller 706. As shown, the height of a blade, such as the blade 802, progressively increases in a radially-outward direction.

Further, the blades are formed as airfoils (e.g., a structure with curved surfaces), which may enhance airflow within the assembly 700. The impeller 706 differs from the impeller 362 in that the blades do not extend radially-inward to a hub 806 of the impeller 706, while the blades (e.g., the blade 600) of the impeller 362 extend radially-inward to a hub of the impeller 362 as shown in FIG. 6.

Referring back to FIG. 7, the assembly 700 may include an inverter board 708. The inverter board 708 can be a printed circuit board (PCB). A PCB mechanically supports and electrically connects electronic components (e.g., microprocessors, integrated chips (ICs), capacitors, resistors, etc.) using conductive tracks, pads, and other features etched from one or more sheet layers of copper laminated onto and/or between sheet layers of a non-conductive substrate. Components are generally soldered onto the PCB to both electrically connect and mechanically fasten them to the PCB.

In an example, the inverter board 708 is ring-shaped. The inverter board 708 can be affixed within the housing 300 via a plurality of bolts.

The inverter board 708 can be configured as a power converter that converts DC power received via the terminal block assembly 327 to three-phase, AC power that can be provided to wire windings of the stator 320 to drive the electric motor 318. The inverter board 708 can include a semiconductor switching matrix (which includes a plurality of transistors). The inverter board 708 can further include a plurality of capacitors such as capacitor 710.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. An assembly comprising:

a housing having a motor housing portion and a spindle housing portion, wherein the spindle housing portion comprises a central tube, wherein the motor housing portion comprises a plurality of fins disposed in a circular array about the motor housing portion;

an electric motor disposed within the motor housing portion of the housing, wherein the electric motor has a rotor;

a spindle coupled to the rotor of the electric motor, wherein the spindle is disposed within the central tube of the spindle housing portion;

an impeller coupled to the spindle and configured to rotate therewith; and a shroud having a top side, a peripheral side, and a plurality of windows formed in the top side, wherein the peripheral side of the shroud is mounted to the plurality of fins of the motor housing portion, wherein as the impeller rotates, the impeller draws air through the plurality of windows of the shroud and directs air to an annular space between the peripheral side of the shroud and the motor housing portion, such that air flows between respective fins of the plurality of fins of the motor housing portion to cool the electric motor.

2. The assembly of claim 1, wherein the plurality of windows include several concentric arrays of windows.

3. The assembly of claim 2, wherein the windows are rectangular in shape.

4. The assembly of claim 1, wherein the spindle comprises a spindle extension, and wherein the assembly further comprises:

an impeller spacer mounted around the spindle extension, wherein the impeller spacer is configured to rotate with the spindle, and wherein the impeller is coupled to the impeller spacer to rotate therewith.

5. The assembly of claim 1, wherein the shroud includes a cylindrical protrusion that is hollow and protrudes downward to be supported by the impeller.

6. The assembly of claim 1, wherein the impeller comprises a plurality of blades formed in a circular array about the impeller, and wherein a radially-outward portion of a blade of the plurality of blades is configured as an airfoil.

7. The assembly of claim 1, wherein the peripheral side of the shroud has a plurality of tabs disposed in a circular array with spaces therebetween, wherein the plurality of tabs interface respectively with the plurality of fins of the motor housing portion.

8. An assembly comprising:

a housing having a motor housing portion and a spindle housing portion, wherein the spindle housing portion comprises a central tube;

an electric motor disposed within the motor housing portion of the housing, wherein the electric motor has a rotor;

a spindle coupled to the rotor of the electric motor, wherein the spindle is disposed within the central tube of the spindle housing portion;

an impeller coupled to the spindle and configured to rotate therewith;

a shroud mounted to the housing and having a plurality of windows, wherein as the impeller rotates, the impeller draws air through the plurality of windows of the shroud to cool the electric motor; and a housing cover mounted to the motor housing portion to form an enclosure in which the electric motor is disposed, wherein the housing cover comprises a circular recess in which the impeller is partially disposed.

9. The assembly of claim 8, further comprising:

a seal mounted in a central hole of the housing cover around the spindle.

10. An assembly comprising:

a housing having a motor housing portion and a spindle housing portion, wherein the spindle housing portion comprises a central tube;

an electric motor disposed within the motor housing portion of the housing, wherein the electric motor has a rotor;

a spindle coupled to the rotor of the electric motor, wherein the spindle is disposed within the central tube of the spindle housing portion;

an impeller coupled to the spindle and configured to rotate therewith; and a shroud mounted to the motor housing portion and having a top side, a peripheral side, and a plurality of windows formed in the top side, wherein the peripheral side tapers inward to form a friction lock with the motor housing portion when mounted thereto.

11. A mower comprising:

a source of electric power;

a mower deck; and one or more assemblies mounted to the mower deck and coupled to respective blades, wherein an assembly of the one or more assemblies comprises:

a housing, an electric motor disposed within the housing, wherein the electric motor has a stator and a rotor, and wherein the source of electric power is configured to provide electric power to wire windings of the stator, a spindle disposed in the housing and coupled to the rotor of the electric motor, wherein the spindle is configured to drive a blade of the respective blades, an impeller coupled to the spindle and configured to rotate therewith, and a shroud having a top side, a peripheral side, and a plurality of windows formed in the top side, wherein the peripheral side of the shroud is mounted to the plurality of fins of the motor housing portion, wherein as the impeller rotates, the impeller draws air through the plurality of windows of the shroud and directs air to an annular space between the peripheral side of the shroud and the motor housing portion, such that air flows between respective fins of the plurality of fins of the motor housing portion to cool the electric motor.

12. The mower of claim 11, wherein the shroud includes a cylindrical protrusion that is hollow and protrudes downward to be supported by the impeller.

13. The mower of claim 11, wherein the assembly further comprises:

a housing cover mounted to the housing to form an enclosure in which the electric motor is disposed, wherein the housing cover comprises a circular recess in which the impeller is partially disposed.

14. The mower of claim 13, wherein the assembly further comprises:

a seal mounted in a central hole of the housing cover around the spindle.

15. The mower of claim 11, wherein the spindle comprises a spindle extension, and wherein the assembly further comprises:

an impeller spacer mounted around the spindle extension, wherein the impeller spacer is configured to rotate with the spindle, and wherein the impeller is coupled to the impeller spacer to rotate therewith.

16. The mower of claim 11, wherein the shroud comprises a top side and a peripheral side, wherein the plurality of windows are formed in the top side, and wherein the peripheral side tapers inward to form a friction lock with the housing when mounted thereto.

17. The mower of claim 11, wherein the impeller comprises a plurality of blades formed in a circular array about the impeller, and wherein at least a radially-outward portion of a blade of the plurality of blades is configured as an airfoil.

18. The mower of claim 11, wherein the peripheral side of the shroud has a plurality of tabs disposed in a circular array with spaces therebetween, wherein the plurality of tabs interface respectively with the plurality of fins of the housing.

* * * * *